US006904561B1

(12) United States Patent
Faraday et al.

(10) Patent No.: US 6,904,561 B1
(45) Date of Patent: Jun. 7, 2005

(54) INTEGRATED TIMELINE AND LOGICALLY-RELATED LIST VIEW

(75) Inventors: Peter Faraday, Seattle, WA (US); Joshua Bell, Kirkland, WA (US); Steven P. Geffner, Bothell, WA (US)

(73) Assignee: Microsoft Corp., Redmond, WA (US)

( * ) Notice: Subject to any disclaimer, the term of this patent is extended or adjusted under 35 U.S.C. 154(b) by 720 days.

(21) Appl. No.: 09/682,116

(22) Filed: Jul. 19, 2001

(51) Int. Cl.[7] .............................................. G06F 3/00
(52) U.S. Cl. ................................................. 715/500.1
(58) Field of Search ............................ 715/500.1, 513, 715/517

(56) References Cited

U.S. PATENT DOCUMENTS

| | | | | |
|---|---|---|---|---|
| 5,675,752 A | * | 10/1997 | Scott et al. | 345/866 |
| 5,758,093 A | * | 5/1998 | Boezeman et al. | 709/249 |
| 5,781,188 A | * | 7/1998 | Amiot et al. | 345/723 |
| 5,861,881 A | * | 1/1999 | Freeman et al. | 715/500.1 |
| 6,188,396 B1 | * | 2/2001 | Boezeman et al. | 715/500.1 |
| 2002/0085034 A1 | * | 7/2002 | Cortright | 345/764 |
| 2002/0194216 A1 | * | 12/2002 | Kanno et al. | 707/500.1 |

OTHER PUBLICATIONS

Courter, Gini and Marquis, Annette, "Mastering Microsoft(r) Ofice 2000 Professional Edition," 1999, Sybex(r), pp. 329–353.*

Microsoft(r) PowerPoint(r) 2000, Help files, Keys for working with menus, , "Keys for working with toolbars,", "Slide show controls," screen printouts.*

Figures 1–14 created with Microsoft(r) PowerPoint(r) 2000, screenshots, 1999.*

Copending U.S. Appl. No. 09/832,255, Animation On Object user Interface, filed Apr. 9, 2001, enclosed herewith.

* cited by examiner

Primary Examiner—Stephen Hong
Assistant Examiner—Kyle Stork
(74) Attorney, Agent, or Firm—Lyon & Harr, LLP; Katrina A. Lyon

(57) ABSTRACT

A system and method for graphically showing the order and timing of elements in a presentation program or other software. The sequence of events is shown in an event list, a list of events in sequence order, each event being associated with an event timeline bar and correlated with a universal timeline, in the editing window of an electronic presentation or other software that deals with the scheduling of events. In one embodiment, each item in the list represents an individual animation effect. Elements of the event list are logically related to each other and these logical relationships may be used in assisting a user to build a sequence of events (e.g., an animation sequence).

1 Claim, 10 Drawing Sheets

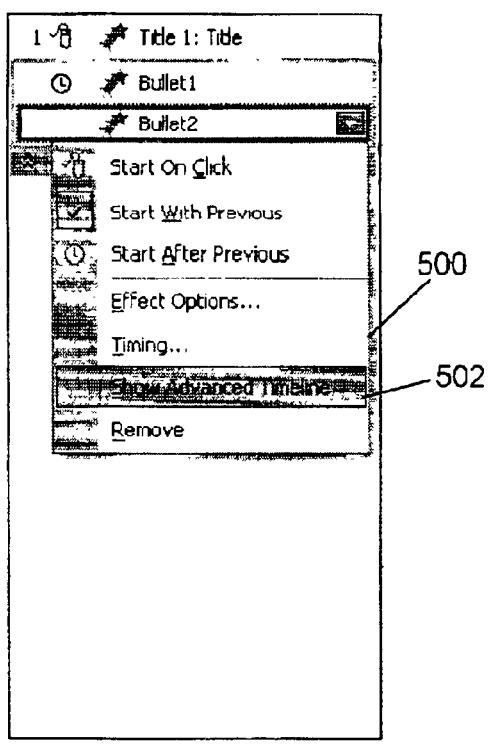
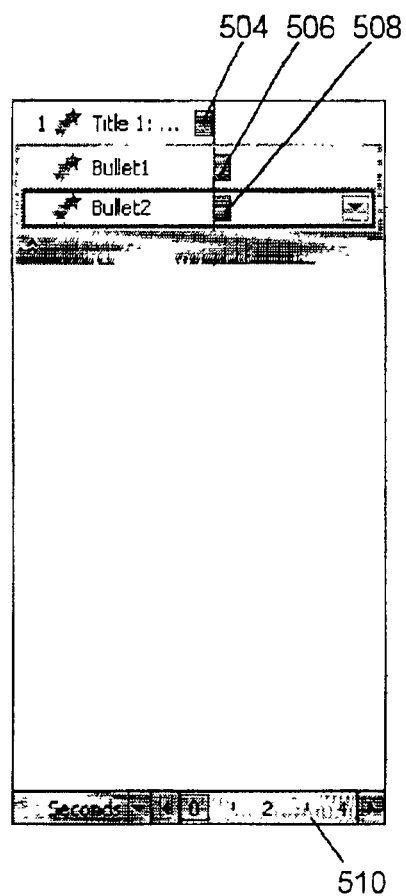
FIG. 5A                    FIG. 5B

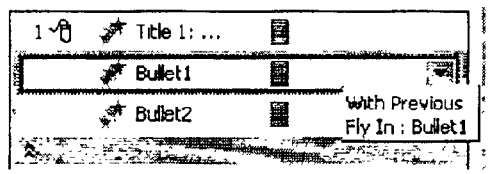
FIG. 5F
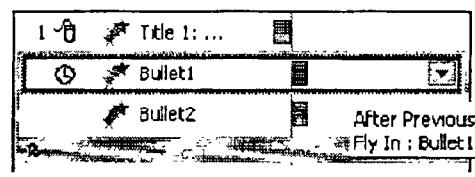
FIG. 5G
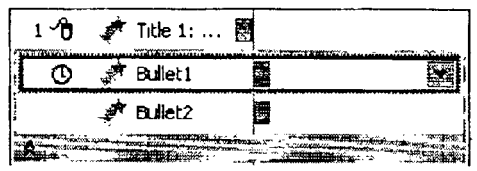
FIG. 5H
FIG. 5I
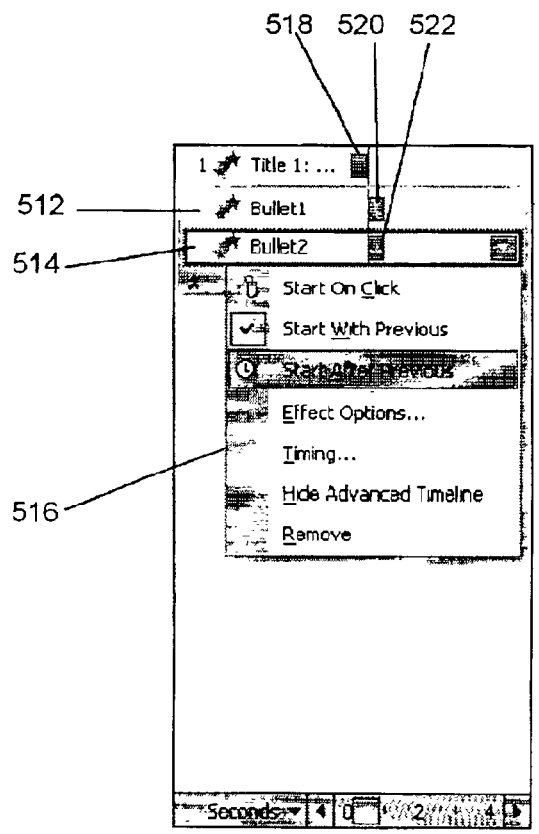
FIG. 5J
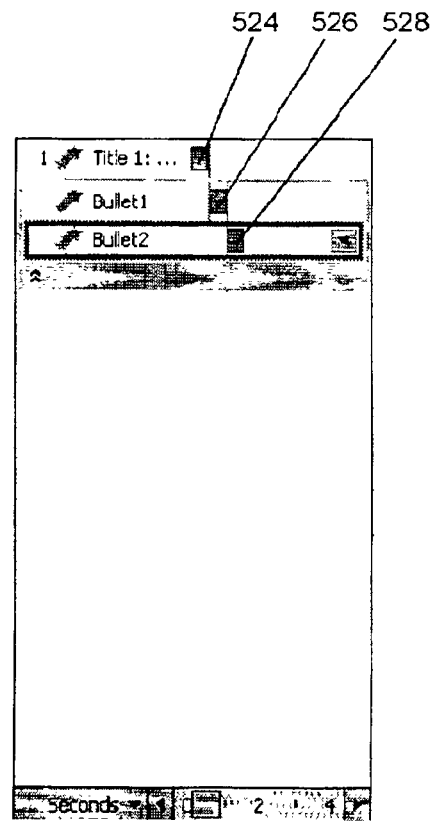
FIG. 5K

INTEGRATED TIMELINE AND LOGICALLY-RELATED LIST VIEW

BACKGROUND OF INVENTION

1. Technical Field

The invention is related to a system and method of customizing a software program, in this case a presentation program, to provide a user with a graphical representation of the order of elements and their timing. This invention is described in terms of creating an animation sequence. The invention could, however, be equally well applied to other software applications, such as, for example, Internet website authoring software, project/program management software, scheduling software programs, electronic mail programs, and gaming software.

2. Background Art

Animation, the adding of a special visual or sound effect to text or an object, is a powerful way to attract and sequence an audience's attention in an electronic presentation. It Is possible to animate text, graphics, diagrams, charts, and other objects to focus the audience on important points, control the flow of information, and add interest to a presentation. Animation in a presentation occurs when objects or animation effects on these objects in a slide are scheduled by the user to appear in a prescribed sequence. When the user then inputs a command for one or more of the objects or effects to appear, they appear in a certain order. For example, a user can have a text bullet on a slide fly into the slide from the left, one word at a time, or hear the sound of applause when a picture is uncovered. Such animation effects include having an object spin, fade in, fade out, fly across the screen, split, descend, ascend, expand, change color, change text characteristics, or be associated with sound or video, to name a few.

Animation is a temporally continuous phenomenon, but is typically programmed in terms of a discrete sequence of changes. One of the problems facing an author producing an animated presentation is that it can be difficult to know which elements in the presentation they have animated, the start and stop times (and hence duration) of each animation element, and in which sequence the animation events will play.

Some existing software that employs animation shows the animation sequence as a simple list. This makes it difficult to reconcile the order in which animation elements or events are going to animate, and how long they are going to animate. There Is no indication as to the timing of each animation event and mental effort is required to match the list to what is being shown in the animation editor, where the animation is composed for later viewing by an audience. Users have complained that they cannot tell which objects on the slides are animated, nor can they determine the sequence and timing of animation effects.

Some software programs use the concept of a simple timeline in order to allow a preview of events in a sequence over time. However, these programs require a user to work entirely in the temporal plane to determine the sequence of events, adjusting the times of each event manually to create the desired sequence of events. This can be very cumbersome and time-consuming since using this method to create a sequence of events is extremely labor-intensive. In order to preview a sequence of events the user must repeatedly search for the times of interest and then take another action to display the events occurring at that time. If the user wishes to modify the sequence or timing of events, they must then take additional actions to modify the timing of each event to produce the desired result.

Therefore, what is needed is a system and method for representing or displaying the order and timing of objects and effects in an animation sequence, that makes it simple for a user to determine which elements are animated, the order in which they are animated, and the animation duration for each animation event. Preferably such a system would include a great deal of automation to simplify user tasks.

SUMMARY OF INVENTION

The system and method according to the present invention solves the problems associated with creating an ordered appropriately-timed animation sequence. It allows a user to easily create and edit an animation sequence. The sequence of animation events or effects is shown in an event list, each animation event being capable of being associated with an event timeline bar that represents the timeline of each animation effect and that is correlated with a universal timeline that provides the timeline for the entire animation sequence. The animation list, event timeline bars and universal timeline are displayed and manipulated in the editing window of an electronic presentation or other software that deals with the scheduling of events. Logical relationships between events are used to automate and simplify the animation sequence creation. The system and method gives a user instant feedback on the sequence of animation events, as well as their timing and duration. It allows the user to debug the animation events in real time when using an animation editor or viewer to create the animation events. Furthermore, it allows the user to easily create a simple sequence of events and then fine-tune it with respect to timing of the events. The system and method also includes an improved timeline scroll bar that allows the user to select desired times and view events occurring at that time in one motion.

Specifically, the system and method according to the present invention consists of a User Interface (UI) that shows the order of the animation events or effects in an ordered event list. Each item in the event list represents an individual animation effect or event. Each event is preferably associated with a number that represents its order in a sequence of mouse clicks or other computer input device selection actions or its logical relationship to other animation events in the event list.

Elements of the aforementioned event list may be logically related to each other. These logical relationships are used in assisting a user to build a sequence of events (e.g., an animation sequence). Exemplary logical relationships between events (or animation effects) include "start with previous" and "start after previous". The "start with previous" logical relationship allows two or more animations to start together at the same time as a previous event in the event list. Thus, the 'start with previous' logical relationship introduces several items at once in the ordered sequence. On the other hand, the "start after previous" logical relationship allows a delay before the next animation is introduced. That is, the 'start after previous' logical relationship causes an event to start after the completion of an immediately previous event or group of events in the event list. Alternately, the user can specify that an event or animation effect should begin with "start on click". This 'start on click' logical relationship means that the user can pause their presentation until they click their mouse (or other computer input device) a specified number of times. This 'start on click' relationship, for example, gives the user time to describe what they are showing on a slide. In one embodiment of the invention, the logical relationship can be defined to start an event at the same time as another triggering event ('start on trigger'), producing an event-driven result. For instance, the user can use this feature to specify that a slide containing background information appear if the user clicks on a particular portion of a slide.

The benefit for the user of the logical relationships is that the user does not have to worry about the timing of the animation events e.g., the user does not have to specify the exact duration of an event or start time in seconds. Nor does the user have to manipulate a complex timeline UI to define a simple sequence of events.

The user may associate a logical relationship with an event in the event list by selecting the event and activating a context-sensitive menu that allows the user to specify the selected event's logical relationship to other events in the event list.

Each event in the event list can also be associated and marked with one or more indicators. Such an indicator can, for instance, represent the number in a sequence of mouse or other computer input device selection actions which causes an animation effect on an associated object or element. Or the indicator can represent the logical relationship of an animation event associated with the object to other animation events in the event list. For instance, an indicator that appears as a clock may be used to represent the 'start after previous' logical relationship of an event. Alternately, an indicator can represent the type of animation effect (e.g., fly in or fade in).

In one embodiment of the present invention, if the user expands the size of the task pane containing the event list in the animation editor then the amount of space to show the event list and associated logical relationship indicators is recalculated. As the user expands the size of this task pane (and hence gives more space to show the information), additional portions of the UI are displayed (e.g., more indicators or more of the event list are displayed). If the user reduces the size of the task pane, less information will be displayed (e.g., the indicators will no longer be displayed, or less events will be displayed on the event list).

To allow the user to set more complex timing relationships, an advanced timeline view is optionally provided in conjunction with the event list. In general, this detailed timeline view graphically shows the timing relationships between events. More specifically, each event in the event list may be associated with an event timeline bar and correlated to a universal timeline showing times (preferably in seconds or portions thereof) that correlate to the event timeline bars displayed in the event list. These event timeline bars are graphically depicted to the right of the elements in the event list, graphically showing the event's start time and end time. These event start and end times correlate to the appropriate times on the universal timeline. Typically, only the event timeline bars corresponding to a specific number of mouse clicks are displayed (as a group) at a given time. However, it is possible to display all of the event timeline bars there is room to display on the slide. The universal timeline scrolls in unison with the visible event timeline bars when a user scrolls from left to right (or vise-versa) to make different event timeline bars visible.

In one embodiment of the invention, the user can place a computer data input device cursor, such as a mouse cursor, over an event timeline bar and a window of additional information will pop up. This pop-up window is typically referred to as a "tool tip". For example, if the user holds down the left mouse button over the left edge on an event timeline bar, the start time of the event will be numerically displayed in a pop-up window. If the user holds down the left mouse button over the middle of the event timeline bar, the event duration will numerically be displayed. Likewise, if the user holds down the left mouse button over the right edge of the event timeline bar, the event end time will be displayed. Alternately, this tool tip or pop-up window may provide a list of the elements associated with the animation event bar. Or the tool tip window could be interactive and allow the user to set up parameters for the animation associated with a specific object.

The user can 'drag and drop' the event timeline bars (with a mouse or other computer input device) to set exact timings. If a users selects and drags the left edge of an event bar with an input device the start time of this event will be moved either earlier or later in time, depending on the direction (left or right) the left edge is dragged. Assuming horizontally-depicted event timeline bars, if a user selects and drags a right edge of an event timeline bar this will move the end time of the event either earlier or later in time. Logically, the duration of the event can be modified by modifying the start and stop times in this manner. Finally, if a user selects and drags the entire event bar with an input device, this action will move the entire event either later or earlier in time, while maintaining its duration.

In one embodiment of the present invention, the user can also specify that an event be defined as a delay between events. In this case, the delay may be depicted as a line from the end-of an event timeline bar to the start of the subsequent event timeline bar, instead of a bar. Or the event timeline bar may be depicted as a bar that is not filled in or that is colored differently from the rest. Additionally, options can be made available to the user to insert both long and short standard delay times between events.

The user of the system and method according to the present invention can use various mouse and keyboard short cut keys to manipulate the event timeline bars of the event list. For example, 'shift' and 'ctrl' keyboard keys can be used to make contiguous and non-contiguous multiple selections in conjunction with a mouse. Furthermore, the user can change the order of animation effects and associated event timeline bars by selecting an animation effect in the animation event list and dragging it up or down the list with a mouse cursor or other computer input device. When the user changes the order of the animation events by doing this, the logical relationships associated with the events in the animation list and the indicators associated with them stay the samethe meaning of the logical relationship and indicators attached to an effect or event is preserved. The user can also delete an event from the event list and the corresponding event timeline bar and associated indicators will be deleted and the logical relationships of the other events in the event list will be recalculated according to a set of logic rules to reflect their new order in the sequence.

In one embodiment of the present invention the user can specify that an event or effect repeats itself. Typically, this feature is selectable by double-clicking on the event from the event list, which brings up a dialog that allows the user to set an event to repeat. Alternately, the user can click the right mouse button to bring up a context-sensitive menu that provides the user with an option to set a repeat interval. The user can also change the created repeat interval by manipulating the event timeline bars.

A single animated object may have zero, one or several event timeline bars associated with it in the animation creation and editing portion of the application software, each event timeline bar corresponding to a different animation event.

However, when the final animation product, such as an electronic presentation, is viewed by an audience the animation event timeline bars, event list and associated universal timeline, are not visible.

The present invention's simultaneous showing of the event timeline bar view in association with the event list view provides a useful UI for both novice and expert. The list view provides an UI that makes it easy for a novice to rapidly build a presentation sequence. The event timeline bar representation of the animation events allows the sequence to then be finessed if the user wants to set more complex relationships, and is also useful for performing fine tuning of the timing of events, as well as finessing more complex timing relationships such as synchronizing text to audio or video. Because the views are combined and allow the user to simply overlay the event list and event timeline bars and associated universal timeline within the same task pane, the user does not have to do work to understand how the timing of various animation events relates to their sequence or vice-versa. The user can switch back and forth between working with the event list or working with the event timeline bars, depending on whether they want to manipulate exact timing, or just build a general sequence. The event list view makes it easy to quickly build a presentation. The user can then manipulate and finesse the general sequence of events by dragging and dropping the event timeline bars with a computer input device, such as a mouse.

In one embodiment, when the user is playing an animation, the timeline view is shown to make it easy for the user to follow the sequence. The timeline scrollbar is shown moving forward in time and the animation events occur as the current time marker, the scrollbar's thumb, reaches them. The user is allowed to pause the animation playback and directly manipulate the event timeline bars by dragging their start or end times. The user can check the event bar timings by 'scrubbing' the thumb of the current time marker (moving within the universal timeline to locate a particular time). This process allows the user to get quick feedback as to the current arrangement of events.

Because the event list view and event timeline bar view are combined, the two views allow the user to set timing constraints. These constraints can be shown as vertical lines in the timeline view. The setting of timing constraints impacts the user in two valuable ways. First, if the user changes the logical relationships with the event timeline bar view visible then the event list is re-drawn to show the new sequence. This saves the user having to perform cumbersome, time-consuming drag operations on the event timeline bars to make them start at the same time, or after another. If the user changes the animation event sequence, the event timeline bar is redrawn to show the new relationships. Without this feature the user would have to use the mouse to align the two event timeline bars, which could be annoying and awkward. Second, if the user sets that an effect or event should finish "after" the previous effect then this constraint is enforced in the event timeline bar. This means that if the user changes another event timeline bar to occur earlier in the sequence then the following event timeline bars will be adjusted to accommodate the constraint. This saves the user having to manually retime each of the other event timeline bars in the sequence as the event timing is automatically reset.

Providing flexible constraints in the creation of an event timeline is highly powerful. It means that the user does not need to individually retime each timeline if they make an adjustment earlier in their presentation the constraint will appropriately push all the other event times (and associated event timeline bars) forward or backward in time.

One embodiment of the present invention contains a specific set of constraint satisfaction rules. These are defined as follows:i)The first event timeline bar in the sequence is never constrained. It cannot be set to start "after previous", since no previous event bar/timeline exists.

ii)Event timeline bars set to start "with previous" are not constrained to one another. The "with previous" logical relationship is treated as a non-constraint, but when it is set the corresponding event is forced to default to start at the start time of the previous event timeline bar.

iii)Event timeline bars set to start "with previous" cannot be retimed prior to an "after previous". The user is not allowed to drag a "with previous" event timeline bar prior to the start of an "after previous". Event timeline bars preceding an "after previous" must start either at the same start time, or later.

iv)Event timeline bars set to start "after previous" start following the longest duration event timeline bar of any "with previous" event timeline bars in the prior block or group (usually a group is defined as corresponding to a specific mouse click or input device action), up to the last "after previous" event timeline bar.

v)Event timeline bars which have no duration i.e., continue forever (such as, for example repeating events), are treated as having an end time the same as their start time. Setting an "after previous" in this case sets the constraint to the start of the timeline.

In one embodiment of the present invention, the timeline view contains a simplified all-in-one scroll bar and seeking control. This simplified timeline control allows the user to seek time and manipulate the view displayed all in one action. As the user scrolls forward in time by manipulating a thumb control (a part of the scrollbar the user can grab with a mouse cursor or other input device) on a universal timeline scrollbar more of the event sequence is made visible to the user. This configuration takes up less screen real estate that conventional timeline controls, and is more discoverable, since it appears as a normal scrollbar. For comparison of the benefits, existing timelines use a separate control to seek time and a normal scrollbar to manipulate the view. These can be unwieldy, since the user has to often scroll and then use a different control to seek to an exact point in time. The timeline scrollbar and associated thumb control of the system and method according to the present invention is a unique UI that makes seeking timing easy and intuitive.

BRIEF DESCRIPTION OF DRAWINGS

The specific features, aspects, and advantages of the present invention will become better understood with regard to the following description, appended claims and accompanying drawings where:

FIGS. 5A and 5B are screen images showing an exemplary implementation of a working example of the present invention wherein animation events are shown as event timeline bars that correlate to a universal timeline.

FIGS. 5F, 5G, 5H, 5I, 5J and 5K are screen images showing an exemplary implementation of a working example of the present invention wherein the event timeline bars are dynamically updated when the logical relationship between events is changed.

DETAILED DESCRIPTION

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
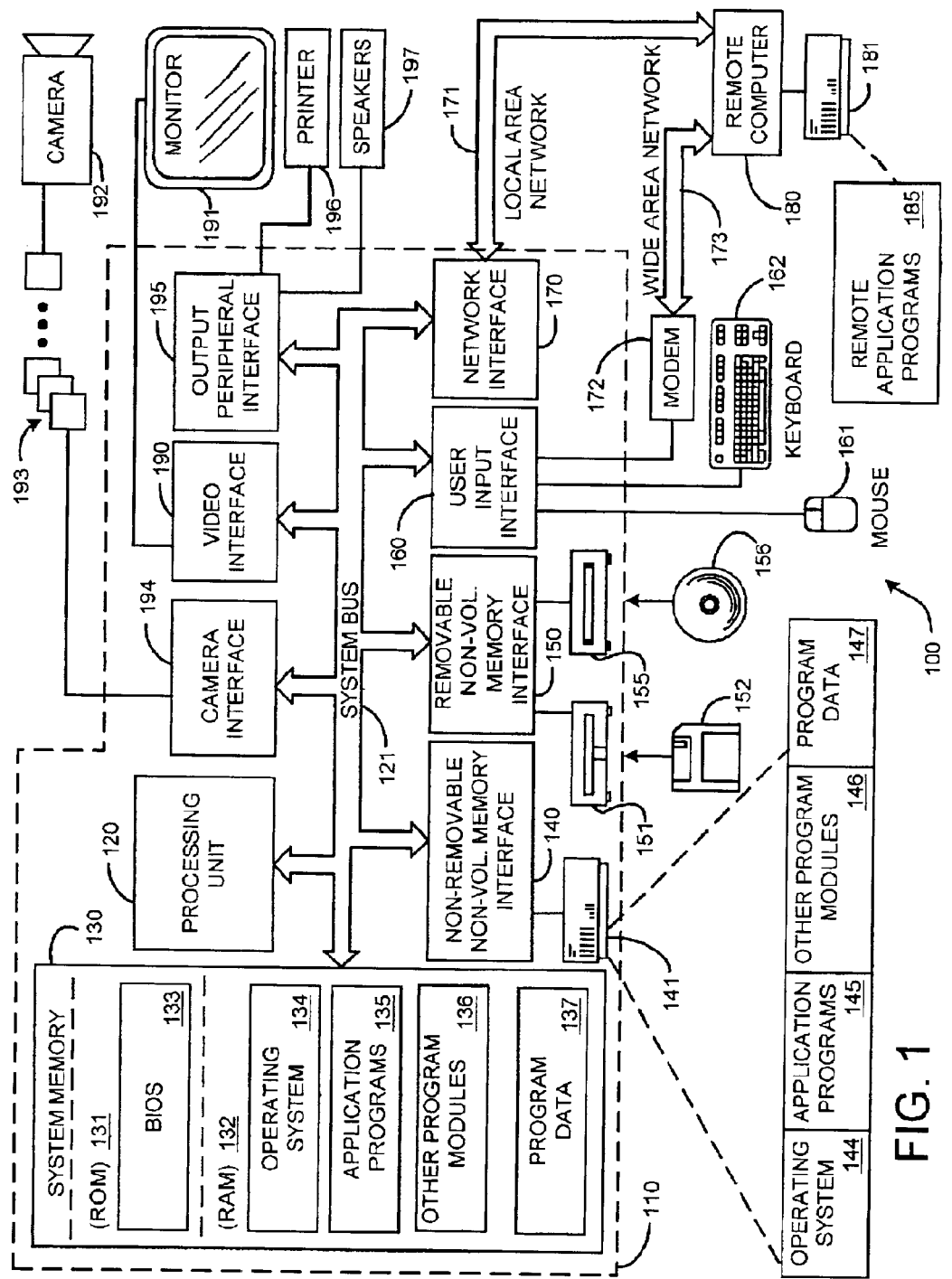
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for Implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

System Overview

In the system and method according to the present invention, a sequence of events is graphically shown in an event list, each event being capable of being associated with an event timeline bar and correlated with a universal timeline that depicts timing for the entire animation sequence. The event list and optimally the event timeline bars and universal timeline are typically displayed in the editing window of an electronic presentation or other software that deals with the scheduling of events. In one embodiment of the present invention, each item in the event list represents an individual animation effect. The invention gives a user instant feedback on the sequence of animation events and their timing and duration during creation of the sequence. It allows the user to debug the animation events in real time when using an animation editor or viewer. The invention can also include an improved timeline scroll bar that allows the user to select desired times and view events occurring at that time in one motion.

Figure 2A:
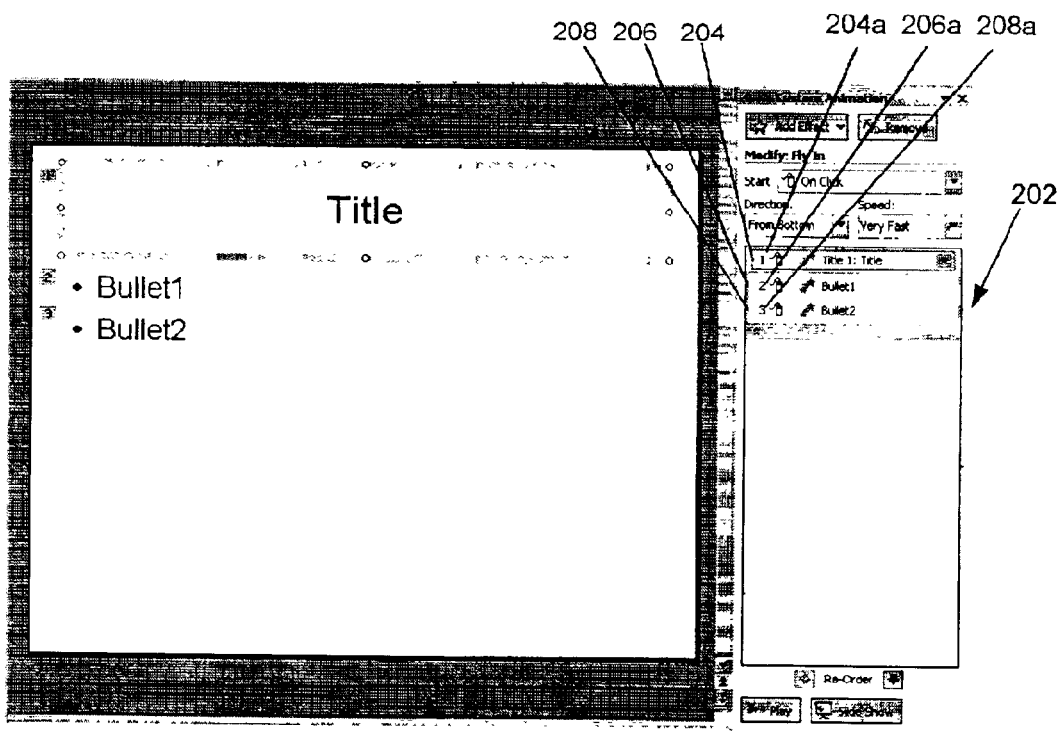
FIGS. 2A and 2B are screen images showing an exemplary Implementation of a working example according to the present invention wherein the logical relationships between events are set in an event list.

More particularly, the invention consists of a User Interface (UI) that shows the order of the animation events in the presentation in an ordered event list. This event list 202 is shown in FIG. 2A. Each item in the list represents an individual animation effect or event. Each effect is preferably associated with a number that represents its order in a sequence of mouse clicks or other computer input device selection actions or its logical relationship to other animation events in the event list. Each event can optionally be associated with an event timeline bar and correlated with a universal timeline. Elements of the event list are logically related to each other (the logical relationships typically being user-specified) and these logical relationships may be used in assisting a user to build a sequence of events (e.g., an animation sequence).

The following paragraphs describe the system and method according to the present invention more specifically.

Logical Relationships between Events

Figure 2B:
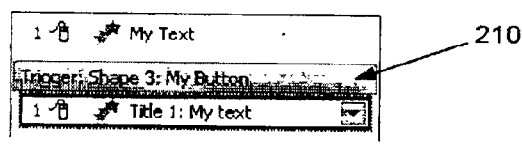

Elements of the event list may be logically related to each other. These logical relationships are typically set by the user on creation of the animation sequence and are used in automating any modifications that are made to the sequence of events. Exemplary logical relationships between events (or animation effects) include "start with previous" and "start after previous". The "start with previous" logical relationship allows two or more animations to start together at the same time as a previous event in the event list. Thus, the 'start with previous' logical relationship introduces several items at once in the ordered sequence. On the other hand, the "start after previous" logical relationship allows a delay before the next animation is introduced. That is, the 'start after previous' logical relationship causes an event to start after the completion of an immediately previous event or group of events in the event list. Alternately, the user can specify that an event or animation effect should begin with "start on click". This 'start on click' logical relationship means that the user can pause their presentation until they click their mouse (or other computer input device) a specified number of times. This 'start on click' relationship, for example, gives the user time to describe what they are showing on a slide. In another embodiment of the invention, a logical relationship can be defined to start an event at the same time as another triggering event (e.g., "start on trigger"), producing an event-driven result. For instance, the user can use this feature to specify that a slide containing background Information appear if the user clicks on a particular portion of a slide. An example of a 'start on trigger' UI is shown in FIG. 2B. A divider 210 is shown that lists the name of the triggering event. Beneath the divider 210 are listed any events 212 that will play when the triggering event is satisfied (e.g., if 'My Button' is clicked on, 'My Text' will fly in).

The user may associate a logical relationship with an event in the event list by selecting the event and activating a context-sensitive menu. This context-sensitive menu 302, shown in FIG. 3A, allows the user to specify the selected event's logical relationship to other events in the event list.

Figures 3A, 3B:
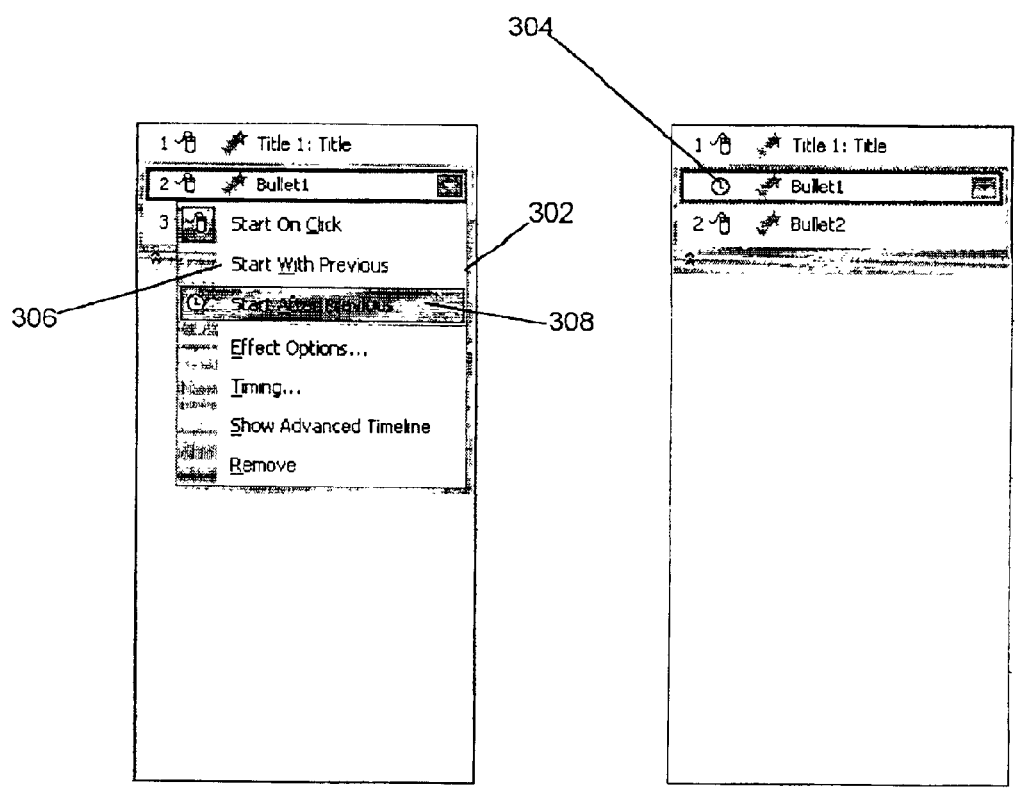
FIGS. 3A and 3B are screen images showing an exemplary implementation of a working example according to the present invention wherein the logical relationships between animation events are changed using a context-sensitive menu.

Each event in the event list can also be associated and marked with one or more indicators. Such an indicator can, for instance, represent the number in a sequence of mouse or other computer input device selection actions which causes an animation effect on an associated object or element. Or the indicator can represent the logical relationship of an animation event associated with the object to other animation events in the event list. In FIG. 3B, the clock indicator 304 represents that the 'bullet' event will occur after the 'title' event appears.

Figures 4A, 4B:
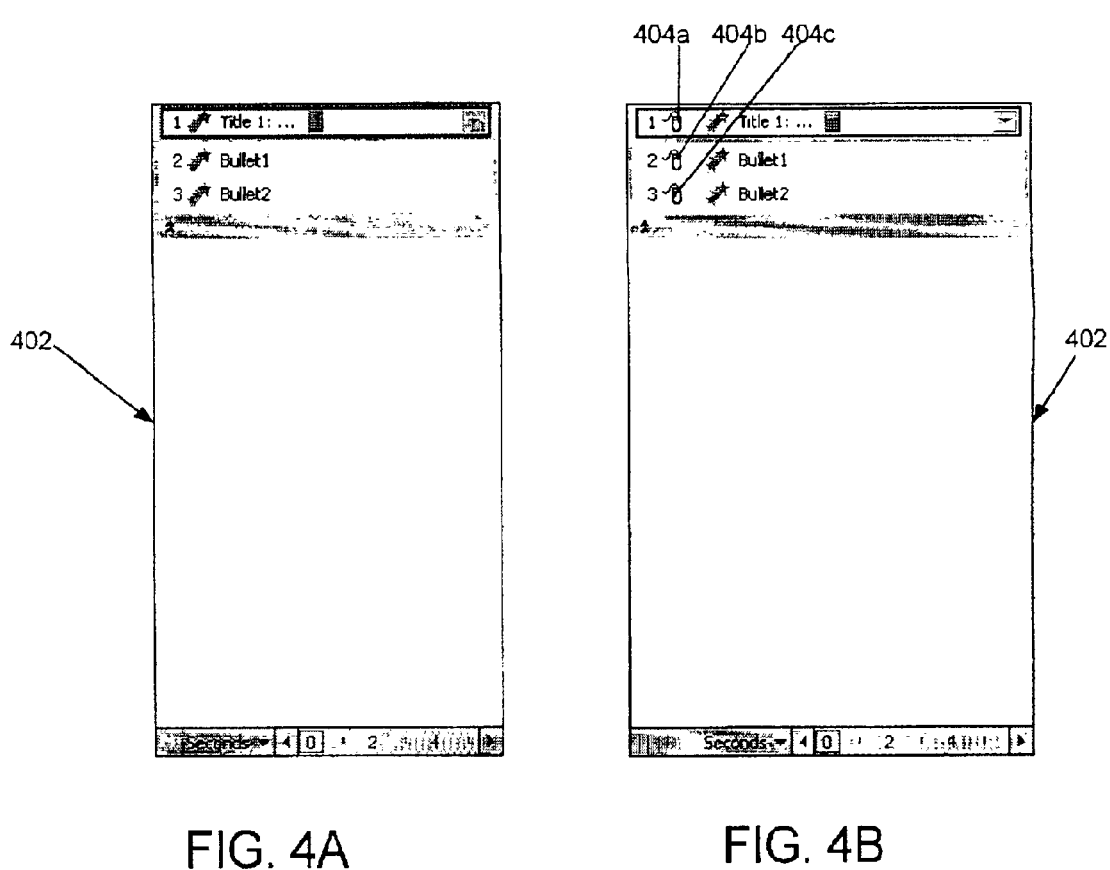
FIGS. 4A and 4B are screen images showing an exemplary implementation of a working example according to the present invention wherein the task pane displaying the event list is widened.

In one embodiment of the invention, shown in FIGS. 4A and 4B, if the user expands the size of the task pane 402 that contains the event list in the editor, then the amount of space to show the event list and associated logical relationship indicators is recalculated. If more space is available more of the animation sequence will be shown. As the user expands the size of the task pane 402 (and hence gives more space to show the information), additional portions of the UI are displayed (e.g., more indicators or more of the event list). If the user reduces the size of the task pane 402, less information will be displayed (e.g., the indicators will no longer be displayed, or less events will be displayed on the event list). FIG. 4A shows the task pane 402 before It is widened. No logical relationship indicators are shown. As can be seen from FIG. 4B, the widening of the task pane 402 causes the 'start on click' indicators 404a, 404b, 404c to be shown.

Event Timeline Bars and Associated Universal Timeline

In another embodiment of the present invention, to allow the user to set more complex timing relationships, an advanced event timeline view is optionally provided in conjunction with the event list. This timeline view may be selected by a user from a context-sensitive menu 500 associated with an event (e.g., 'show advanced timeline' 502, shown in FIG. 5A). In general, this detailed timeline view graphically shows the timing relationships between events. More specifically, referring to FIG. 5B, each event in the event list may be associated with an event timeline bar (504, 506, 508) and correlated to a universal timeline 510 showing times (preferably in seconds or portions thereof) that correlate to the event timeline bars displayed in the event list. These event timeline bars are graphically depicted as starting at an event start time and ending at an event end time. Typically, only the event timeline bars corresponding to a specific number of mouse clicks is displayed (as a group) at a given time. For example, if a series of animation events are to occur on the third mouse click, the system will display all of the event timeline bars associated with events that will occur on the third mouse click, but will not display event timeline bars associated with events occurring on the first and second mouse clicks. However, it is possible to display all of the event timeline bars there is room to display on the slide or task pane.

Figure 5C:
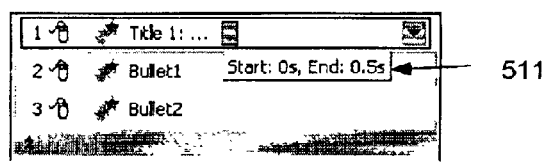
FIG. 5C is a screen image showing an exemplary implementation of a working example of the present invention wherein a pop-up window provides additional information on an event timeline bar.

In an alternate embodiment of the invention, shown in FIG. 5C, the user can place a computer data input device cursor, such as a mouse cursor, over the animation event timeline bar and a window of additional information will pop up. This pop-up window 511 is typically referred to as a "tool tip". For example, assuming horizontally-oriented event timeline bars, if the user holds down the left mouse button over the left edge on an event timeline bar, the start time of the event will numerically be displayed. If the user holds down the left mouse button over the middle of the event timeline bar, the event duration will be numerically displayed in a pop-up window. Likewise, if the user holds down the left mouse button over the right edge of the event timeline bar, the event end time will be displayed. Alternately, this tool tip or pop-up window 511 may provide a list of the elements associated with the animation event bar. Or the tool tip window could be interactive and allow the user to set up parameters for the animation associated with a specific object.

Figure 5D:
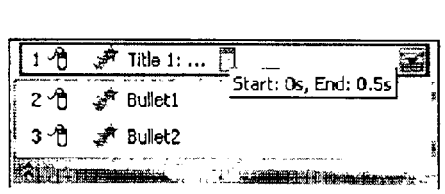
FIGS. 5D and 5E are screen images showing an exemplary implementation of a working example according to the present invention wherein event timeline bars are dragged and dropped with a computer input device to set the exact timing of events.
Figure 5E:
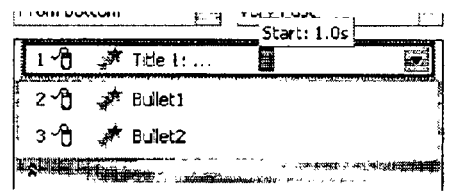

The user can drag and drop these event timeline bars (with a mouse or other computer input device) to set exact timings. Again, assuming horizontal event timeline bars, if a users selects and drags the left edge of an event timeline bar with an input device the start time of this event will be moved either earlier or later in time, depending on the direction (left or right) the left edge Is dragged. If a user selects and drags a right edge of an event bar this will move the end time of the event either earlier or later in time. Logically, the duration of the event can be modified by modifying the start and stop times in this manner. Finally, If a user selects and drags the entire event bar with an input device, this action will move the entire event either later or earlier in time, while maintaining its duration. An example of the UI for the drag and drop operation is depicted in FIGS. 5D and 5E. FIG. 5D shows the timing of the Title event before it is dragged to a later time. FIG. 5E depicts the Title event after the event has been moved to occur a second later in time.

In another embodiment of the present invention, the user can also specify that an event be defined as a delay between events. In this case, the delay may be depicted as a line, instead of a bar. This line extends from the end of one event timeline bar to the start of the next event timeline bar. Or the event timeline bar may be depicted as a bar that is not filled in or that is colored differently from the rest. Additionally, options can be made available to the user to insert both long and short standard delay times between events.

The user of the system and method according to the present invention can use various mouse and keyboard short cut keys to manipulate the event timeline bars of the event list. For example, 'shift' and 'ctrl' keyboard keys can be used to make contiguous and non-contiguous multiple selections in conjunction with a mouse. Furthermore, the user can change the order of animation effects and associated event bars by selecting an animation effect in the animation event list and dragging it up or down the list with a mouse cursor or other computer input device. When the user changes the order of the animation events by doing this, the logical relationships associated with the events in the animation list and the indicators associated with them stay the samethat is, the meaning they attach to an event or effect is preserved. An example of changing a relationship to an 'after previous' from a 'with previous' logical relationship for the 'Bullet1' event is shown in FIGS. 5F and 5G. FIG. 5F depicts the "before change" condition, while FIG. 5G shows the event timeline bars after the logical relationship has been changed. As can be seen from these figures, the event timeline bars are changed from all occurring at the same time to 'Bullet1' (and 'Bullet2' that occurs with 'Bullet1') occurring after the 'Title1' event has completed.

The user can also delete an animation effect from the animation list and the corresponding event bar and associated indicators will be deleted and the logical relationships of the other animation events in the event list will be recalculated according to a set of logic rules to reflect their new animation order in the animation sequence. FIGS. 5H and 5I provide an example of an embodiment wherein an event is deleted. FIG. 5H shows the event list before the Bullet1 event is deleted. In FIG. 5I, which depicts the event timelines after deletion of the Bullet1 event, the Bullet2 event is then retimed to occur 'with previous' based on the logical relationship associated with this event.

In one embodiment of the present invention the user can specify that an event repeat itself. This feature is selectable by double-clicking on the event from the event list to bring up a dialog window that allows the user to set the repeat interval. Alternately, the user can right click on the event list entry to bring up a context-sensitive menu. This context-sensitive menu provides the user an option to set a repeat interval. The user can also change the created repeat interval by manipulating the event timeline bars.

An single animated object may have zero, one or several event timeline bars associated with it in the animation creation and editing portion of the application software, each event timeline bar corresponding to a different animation event. However, when the final animation product, such as an electronic presentation, is viewed by an audience the animation event timeline bars, event list and associated universal timeline, are not visible.

Figure 6A:
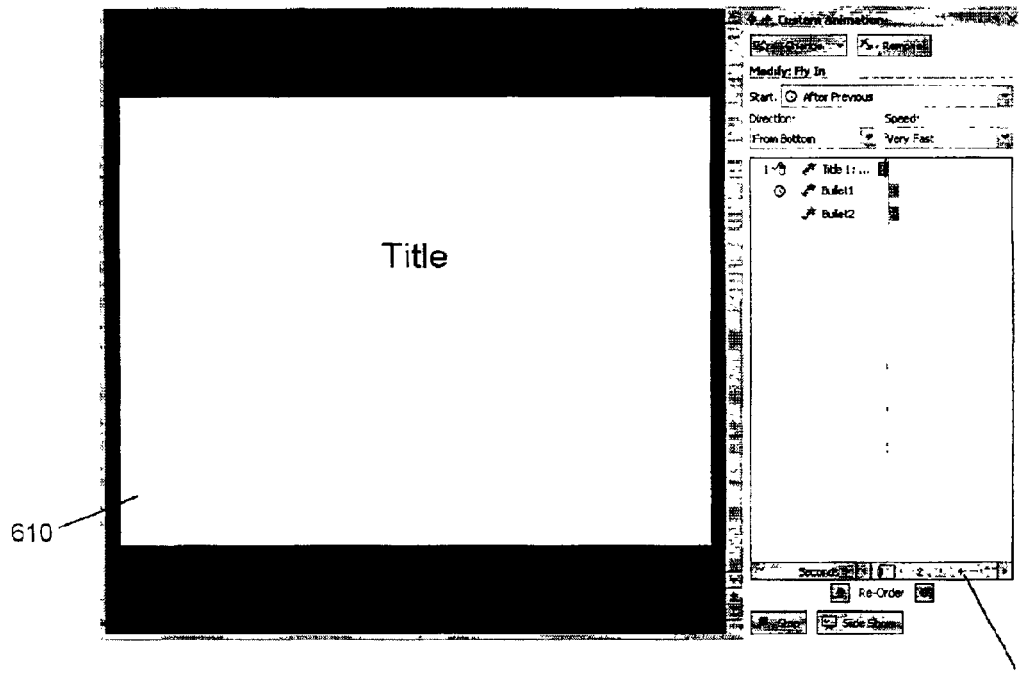
FIGS. 6A and 6B are screen images showing an exemplary implementation of a working example of the present invention wherein the user plays an animation event sequence in the animation editor.
Figure 6B:
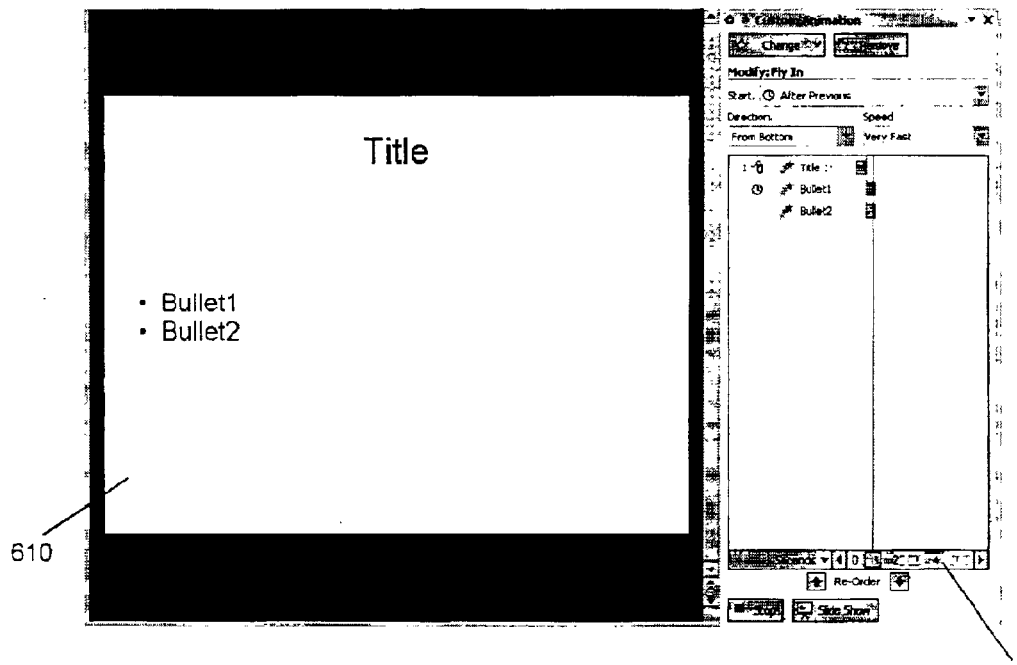

In one embodiment, when the user is playing an animation, the timeline view is shown to make it easy for the user to follow the sequence. The universal timeline scrollbar is shown moving forward in time and the animation events occur as the current time marker, the scrollbar's thumb, reaches them. The user is allowed to pause the animation playback and directly manipulate the event timeline bars by dragging their start or end times. The user can check the event bar timings by 'scrubbing' (moving within the universal timeline to locate a particular time) the thumb or current time marker. This process allows the user to get quick feedback as to the current arrangement of events. FIGS. 6A and 6B provide examples of the present invention when the user is playing back an animation sequence. FIG. 6A shows the universal timeline 608 at 0.5 seconds, and only the 'Title' event has been animated at this time on the animation playback display pane 610. FIG. 6B shows the universal timeline 608 at 1 second, at which time the 'Bullet1' and 'Bullet2' events are also animated (e.g., 'fly in' to the slide) on the animation playback display pane 610.

Timing Constraints

Because the event list view and event timeline bar view are combined, the two views allow the user to set timing constraints. If the user changes the logical relationships with the event timeline bar view visible then the event list is re-drawn to show the new sequence. If the user changes the animation event sequence, the event timeline bar is redrawn to show the new relationships. Without this feature the user would have to use the mouse to align the two event timeline bars, which could be annoying and awkward. If the user sets that an effect should finish "after" the previous effect then this constraint is enforced in the event timeline bar. This means that if the user changes another event timeline bar to occur earlier in the sequence then the events will be adjusted to accommodate the constraints of the following event bars/timelines. This saves the user having to manually retime each of the other event timeline bars in the sequence.

One embodiment of the present invention contains a specific set of constraint satisfaction rules. These are defined as follows.

i) The first event timeline bar in a sequence is never constrained. It cannot be set to start "after previous", since no previous event bar/timeline exists.

ii) Event timeline bars set to start "with previous" are not constrained to one another. Having the "with previous" constraint enforced would make the event timeline bar feature annoying to use, since retiming any event timeline bar would force all the other event timeline bars preceding it to be retimed as well. The "with previous" logical relationship is treated as a non-constraint, but when it is set the corresponding event is forced to default to start at the start time of the previous event timeline bar.

iii) Event timeline bars set to start "with previous" cannot be retimed prior to an "after previous". The user is not allowed to drag a "with previous" event timeline bar prior to the start of an "after previous". This prevents the user from re-ordering the sequence out of the logical order event timeline bars preceding an "after previous" must start either at the same start time, or later.

iv) Event timeline bars set to start "after previous" start following the longest duration event timeline bar of any "with previous" event timeline bars in the prior block or group (a group is usually defined as corresponding to a specific mouse click or input device action), up to the last "after previous" event timeline bar. This is because the "with previous" event timeline bars are not constrained. Hence, it is necessary to force an "after previous" to start following the longest duration.

v) Event timeline bars which have no duration i.e., continue forever (such as, for example repeating events), are treated as having an end time the same as their start time. Setting an "after previous" in this case sets the constraint to the start of the timeline.

Simplified All-In-One Scroll Bar and Timeline Thumb

Figures 7A, 7B:
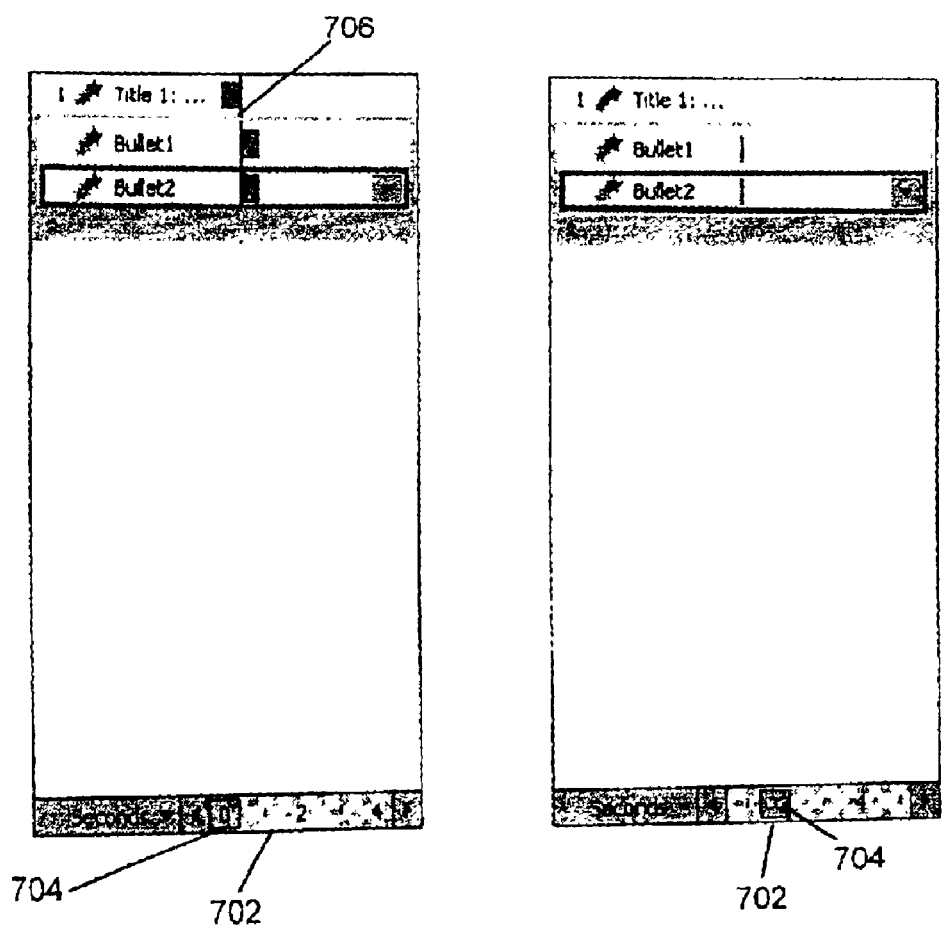
FIGS. 7A and 7B are additional screen images showing an exemplary implementation of the present invention wherein a simplified scroll bar is depicted.

In one embodiment of the present invention, shown in FIGS. 7A and 7B, the timeline view contains a simplified all-in-one scroll bar and seeking control. This simplified timeline control allows the user to seek time and manipulate the view displayed all in one action. As the user scrolls forward in time by manipulating a thumb control on a universal timeline scrollbar more of the event sequence is made visible to the user. (A thumb is the part of a scrollbar the user can grab with his mouse cursor or other input device to navigate using the scrollbar.) Additionally, as the user holds his cursor to the right edge of the universal scroll bar the events displayed will continue infinitely in time. Similarly, if the user holds his cursor to the right edge of the scroll bar the events displayed will continue backwards in time infinitely. This simplified all-in-one scroll bar takes up less screen real estate that conventional timeline controls, and is more discoverable, since It appears as a normal scrollbar. For comparison of the benefits, existing timelines use a separate control to seek time and a normal scrollbar to manipulate the view. These can be unwieldy, since the user has to often scroll and then use a different control to seek to an exact point in time.

WORKING EXAMPLES

The following paragraphs and figures provide additional working examples of the system and process according to the present invention.

As shown in FIG. 2A, each event (204, 206, 208) in the presentation to which the user has applied animation is shown in the event list 202. The event list 202 is a list of the effects which are to play in the slide. This event list 202 can be thought of as a script it is read from top to bottom and gives the ordering of each effect to play in a slide show. On the left side of the list, a sequence number is provided (204a, 206a, 208a). The number gives the sequence order in which the animation will play. In this example, this number also corresponds to the number of mouse clicks or other input device actions that will cause an animation effect to take place (i.e., this is how many mouse clicks in the presentation are required to play to this point in the sequence). In the example in FIG. 2A, "title" will fly into the slide on the first click, followed by "bullet1" on the next mouse click and "bullet2" on another mouse click.

In the system and method according to the present invention, the user can also set up using logical relationships between effects to "start with previous" 306 and "start after previous" 308, as is shown in FIG. 3A. The principle in this case is that "start with previous" allows two or more animations to start together at the same time introducing several items at once; whereas "start after previous" allows a delay before the next animation is introduced. "Start on click" means that the user can pause their presentation until they click their mouse giving them time to describe what they are showing. This user interface makes setting timing and sequencing easy for all users. The example in FIG. 3B shows that the 'Title1' event is set to animate on the first mouse click, then after it is finished animating, the 'Bullet1' event will animate. On the second mouse click the 'Bullet2' event will animate. The user does not have to worry about timing e.g., specifying exact duration or start times in seconds, or manipulating a complex timeline UI to define their sequence.

Because the timeline and event list views are combined and allow the user to simply overlay the two within the same task pane, the user does not have to do work to understand how the timeline relates to their sequence or vice-versa; and can switch back and forth between the timeline and event list views depending on whether they want to manipulate exact timing, or just build a general sequence. This benefit is shown in FIGS. 5A and 5B. As shown in FIG. 5A, the list view makes it easy to quickly build a presentation without worrying about timing or making complex manipulations. The user simply creates each animation event and sets its logical relationship using the context-sensitive menu 500. The user can then access the timeline view by selecting 'show advance timeline' 502 from the menu 500. As shown in FIG. 5B, switching to the timeline view shows graphically that the 'Ttitle1' event 504 starts on a click, and that the 'Bullet1' 506 and 'Bullet2' events 508 will be animated after it, because their event timeline bars are placed further along the time axis. The user can then manipulate and finesse these event timelines by dragging and dropping the events in their entirety, or just the edges of the events to change the start and stop times of the events.

If the user changes the logical relationships with the timeline view visible then the event timeline bars are re-drawn to show the new sequence. This saves the user having to perform cumbersome and time-consuming drag operations on the timelines to make them start at the same time, or after another. In FIGS. 5J and 5K, the user changes the 'Bullet2' event 514 to start after the 'Bullet1' event 512, by using the context-sensitive menu 516. The event timeline bars (518, 520, 522) in FIG. 5J are redrawn in FIG. 5K (524, 526, 528) to show the new relationships. Without this feature the user would have to use the mouse to align the event timelines, which could be annoying and awkward.

Figure 6C:
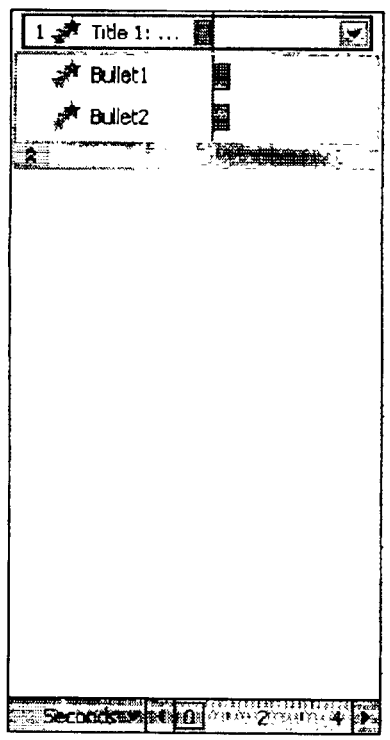
FIGS. 6C and 6D are additional screen Images showing an exemplary implementation of the present invention wherein the event bars and timeline are dynamically updated when the logical relationship between events is changed.
Figure 6D:
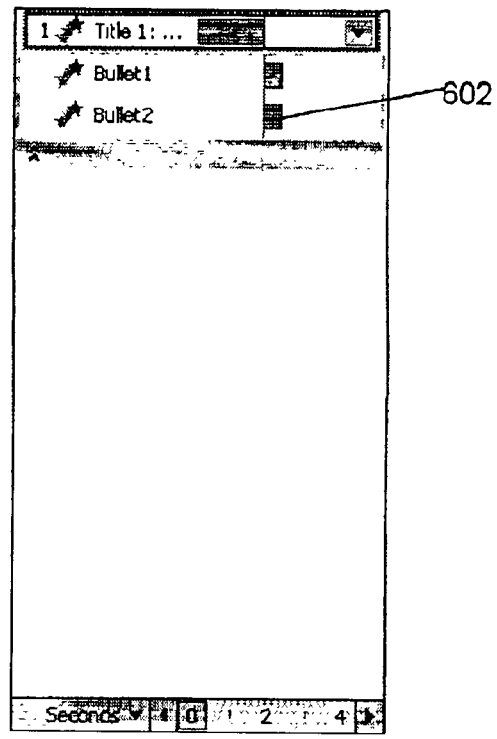

If the user sets that an effect should finish "after" the previous effect then this constraint is enforced in the event timeline. This means that if the user changes another event timeline bar earlier in the sequence then all of the following event timeline bars will be adjusted. In the example in FIG. 6C, the user retimes the end of the "Title1" event. As shown in FIG. 6D, this also forces the start times of the 'Bullet1' and 'Bullet2' events to be changed to maintain the "after" relationship. These constraints are shown by the vertical line 602 running from the end of the "Title" event timeline bar to the start of the "Bullet1" and "Bullet2" event timeline bars. The enforcement of these constraints saves the user from having to manually retime each of the other event timeline bars in the sequence.

Providing flexible constraints in a timeline is unique and highly powerful. It means that the user does not need to individually retime each event timeline if they make an adjustment earlier in their presentation the constraint will push all the other event timelines forward or backward in time.

The combined scrollbar and seeking control of the present invention is shown in FIGS. 7A and 7B. The thumb control 704 is used to control the time on the universal timeline scroll bar 702. As the user scrolls forward in time by manipulating the thumb control 704 more of the event sequence is made visible to the user. Note that the constraint between events is shown as a vertical line 706.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented process for viewing and controlling an animation sequence comprising the process actions of:

displaying an event list containing one or more animation events in an ordered sequence; and displaying an event timeline graphically depicting the timing of the animation event which can be displayed for each animation event, wherein each said animation event in said event list is depicted by an event timeline bar which indicates the animation event's start time, stop time and duration, each event timeline bar being correlated to said universal timeline; and wherein the event timeline bars are horizontally depicted and wherein the start time of an event bar is numerically indicated in a pop up window when the left edge of the event bar is selected with an input device; and wherein the end time of an event is numerically indicated in a pop up window when the right edge of the event bar is selected with an input device; and wherein the duration of an event is numerically indicated in a pop-up window when the center of the event bar is selected with an input device.

* * * * *